United States Patent [19]

Jackson et al.

[11] Patent Number: 4,897,217

[45] Date of Patent: Jan. 30, 1990

[54] METHOD FOR PRODUCING ALKALINE EARTH HALOPHOSPHATE STIR-IN PHOSPHORS

[75] Inventors: Douglas M. Jackson, Monroeton; John A. Arbie, Sr.; Richard G. W. Gingerich, both of Towanda, all of Pa.

[73] Assignee: GTE Products Corporation, Stamford, Conn.

[21] Appl. No.: 337,679

[22] Filed: Apr. 13, 1989

[51] Int. Cl.$^4$ .............................................. C09K 11/73
[52] U.S. Cl. ........................ 252/301.4 P; 252/301.4 H
[58] Field of Search ................. 252/301.4 P, 301.4 H, 252/301.6 P

[56] References Cited

U.S. PATENT DOCUMENTS

| | | | |
|---|---|---|---|
| 3,597,366 | 8/1971 | Graff et al. | 252/301.4 P |
| 3,864,274 | 2/1975 | Heytmeijer | 252/301.4 P |
| 3,927,180 | 12/1975 | Chenot | 252/301.4 P |
| 3,940,343 | 2/1976 | Demarest et al. | 252/301.4 P |
| 4,479,521 | 10/1984 | Lubold et al. | 252/301.4 P |
| 4,826,622 | 5/1989 | Gingerich et al. | 252/301.4 P |

*Primary Examiner*—Jack Cooper
*Attorney, Agent, or Firm*—Robert E. Walter; L. Rita Quatrini

[57] ABSTRACT

A method is disclosed for producing alkaline earth halophosphate stir-in phosphors which comprises forming a mixture of about 55% to 75% calcium monohydrogen phosphate, about 15% to 35% calcium carbonate, about 2% to 20% ammonium chloride, about 1% to 15% manganese carbonate, about 1% to 15% antimony trioxide, and about 2% to 10% by weight calcium fluoride, wherein the average particle size of the calcium monohydrogen phosphate by Fisher subseive size is about 4.6 to 6.8 micrometers in diameter and the 50% Coulter Counter size is about 9.0 to 11.5, firing in a non-reacting atmosphere at 600° C. to 1300° C., milling in acid, wet screening through a first screen of greater than 300 mesh, removing the acid, suspending the material in water, screening through a second screen of greater than 350 mesh, adding base to form a slurry, removing the liquid phase from the slurried phosphor material, drying, transferring the material by vacuum to holding means, and transferring the material by gravity from the holding means to a vibratory feeder, transferring the material from the vibratory feeder by gravity to a third screen of greater than 350 mesh, and passing the material through the third screen wherein vacuum pulls the material to and through the screen and at the same time a flow of air behind the third screen results in vibration of the particles of the material as they pass through the third screen, and thereafter passing the particles under vacuum to collecting means.

1 Claim, 2 Drawing Sheets

METHOD FOR PRODUCING ALKALINE EARTH HALOPHOSPHATE STIR-IN PHOSPHORS

BACKGROUND OF THE INVENTION

This invention relates to a method for producing alkaline earth halophosphate stir-in phosphors in larger volumes than have been previously produced by a method in which conditions such as particle size of the starting calcium monohydrogen phosphate, and milling time are controlled and in which the final sifting of the phosphor is done by a unique technique which involves non-shearing action.

Up to this time alkaline earth halophosphate phosphors were produced using mechanical vibratory screening technology in which the screens had to be cleaned often due to build up of phosphor material thereon. This was disadvantageous because it was very labor intensive and inefficient. Losses of large amounts of phosphor were due to dusting and cleaning of the screens.

SUMMARY OF THE INVENTION

In accordance with one aspect of the invention there is provided a method for producing alkaline earth halophosphate stir-in phosphors which comprises forming a mixture of about 55% to 75% calcium monohydrogen phosphate, about 15% to 35% calcium carbonate, about 2% to 20% ammonium chloride, about 1% to about 15% manganese carbonate, about 1% to 15% antimony trioxide, and about 2% to 10% by weight calcium fluoride, wherein the average particle size of the calcium monohydrogen phosphate by Fisher subseive size is about 4.6 to 6.8 micrometers in diameter and the 50% Coulter Counter size is about 9.0 to 11.5, firing in a non-reacting atmosphere at 600° C. to 1300° C., milling in acid, wet screening through a first screen of greater than 300 mesh, removing the acid, suspending the material in water, screening through a second screen of greater than 350 mesh, adding base to form a slurry, removing the liquid phase from the slurried phosphor material, drying, transferring the material by vacuum to holding means, and transferring the material by gravity from the holding means to a vibratory feeder, transferring the material from the vibratory feeder by gravity to a third screen of greater than 350 mesh, and passing the material through the third screen wherein vacuum pulls the material to and through the screen and at the same time a flow of air behind the third screen results in vibration of the particles of the material as they pass through the third screen, and thereafter passing the particles under vacuum to collecting means.

DETAILED DESCRIPTION OF THE INVENTION

Figure 1:
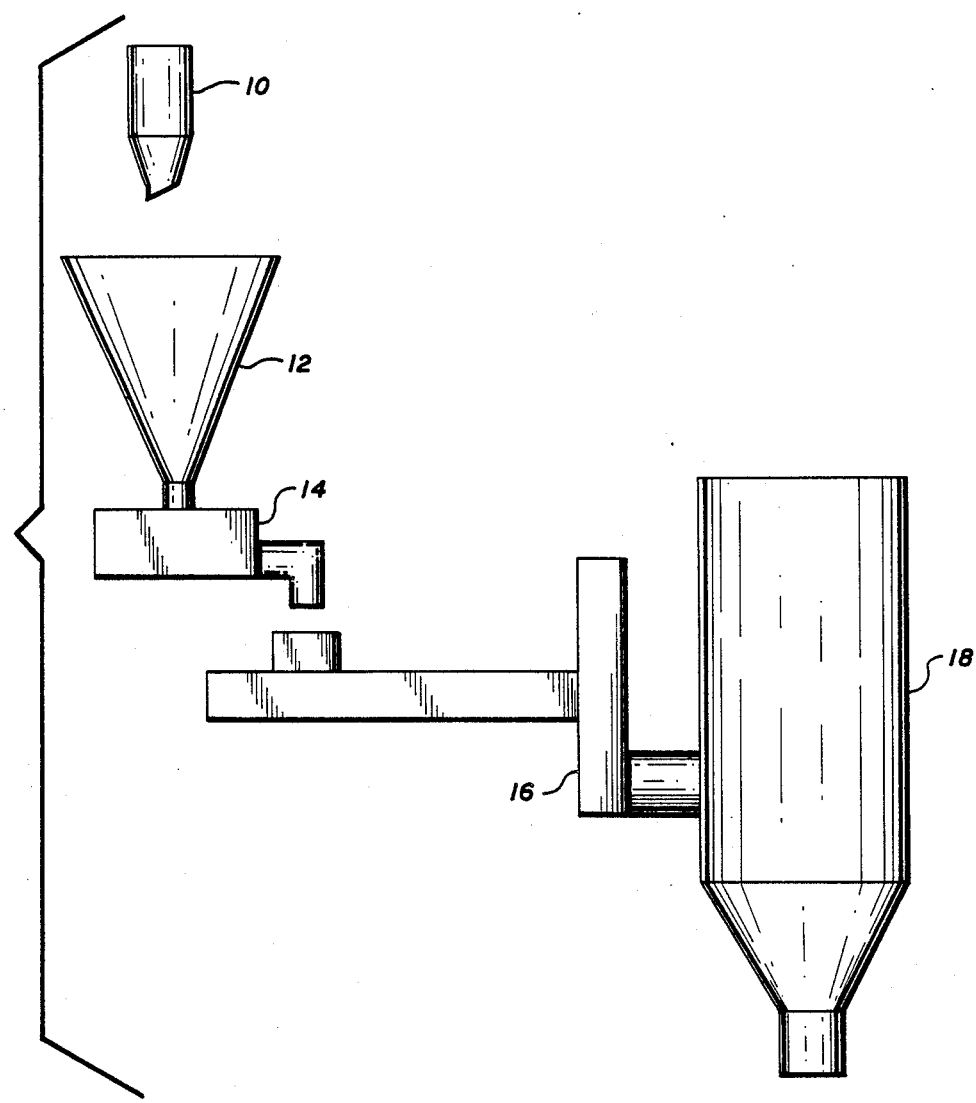
FIG. 1 is a diagram showing the steps of gentle vibratory screening and collection of the dried phosphor.

For a better understanding of the present invention, together with other and further objects, advantages and capabilities thereof, reference is made to the following disclosure and appended claims in connection with the above described drawings and description of some of the aspects of the invention.

The method of the present invention results in production of alkaline earth halophosphate phosphors in which one of the starting materials, calcium monohydrogen phosphate has a smaller particle size and a narrower particle size distribution that was used previously. Also the milling time of the phosphor is controlled. Finally, after the phosphor is dried, it is kept under vacuum and screened with gentle vibration. The series of steps results in greater throughput than previously attained, that is, an increase in throughput of at least about 400% than in prior methods.

The phosphors that are made by the process of the present invention are alkaline earth halo phosphates for use in fluorescent tubes. They have the general formula $Ca_5(F_{1-x},Cl_x)(PO_4)_3$:Sb:Mn.

The starting raw materials are calcium monohydrogen phosphate, calcium carbonate, ammonium chloride, manganese carbonate, antimony trioxide, and calcium fluoride. It is critical to the practice of the present invention that the calcium monohydrogen phosphate have an average particle size as measured by Fisher subseive size (FSSS) of from about 4.6 to about 6.8 micrometers in diameter. It is also critical that the particle size distribution be narrow, that is that the 50% size as measured by Coulter Counter be from about 9.0 to about 11.5 micrometers in diameter, and preferably from about 9.0 to about 10.5 micrometers in diameter.

A uniform mixture is made up of the above raw materials in the following weight percents: from about 55 to about 75 calcium monohydrogen phosphate, from about 15 to about 35 calcium carbonate, from about 2 to about 20 ammonium chloride, from about 1 to about 15 manganese carbonate, from about 1 to about 15 antimony trioxide, and from about 2 to about 10 calcium fluoride. These materials are blended by standard dry blending techniques.

The mixture is fired in a non-reacting atmosphere, preferably nitrogen at a temperature of from about 600° C. to about 1300° C. for a sufficient time to produce a fired material containing the phosphor. The firing time depends on factors such as temperature, nature of the equipment, size of the charge, etc.

The fired material is then subjected to the following steps to prepare the phosphor for direct use in the application without any further treatment, that is, to make it a "stir-in" phosphor.

The resulting fired material is then normally finger crushed and roll crushed. This is done preferably with a finger crusher made by Jacobson.

The resulting fired material is then milled in an aqueous acid liquid medium to wash the particle surfaces of the phosphor crystals. The acid can be a mineral or organic acid. The milling is normally for a length of time of about 1.5 hours to about 4 hours per about 1000 kg of material. The milling is done preferably in a vibratory mill such as that manufactured by SWECO.

The resulting milled material is then wet screened directly from the milling operation through a first screen of greater than about 300 mesh. The higher the mesh size, the longer the milling time. The mesh size is critical to the practice of the present invention because if the material is wet classified to smaller size, the material can be dry classified smaller without as much coarse or out of size material.

The acid medium is then removed from the milled material preferably by drum filtration with a wash bar for water washing while the material is being filtered.

The resulting milled and screened material is then suspended in water to result in a specific gravity of from about 1.300 to about 1.400. The resulting suspension is then screened through a second screen of greater than about 350 mesh.

The resulting screened suspension is then combined with an aqueous base to form a slurry at a pH of from about 7.0 to about 9.0.

The liquid phase, that is the base and water, is then removed from the resulting slurried phosphor material.

The slurried phosphor material is then dried in air preferably in a rotary calciner at a temperature of from about 400° C. to about 700° C.

Figure 2:
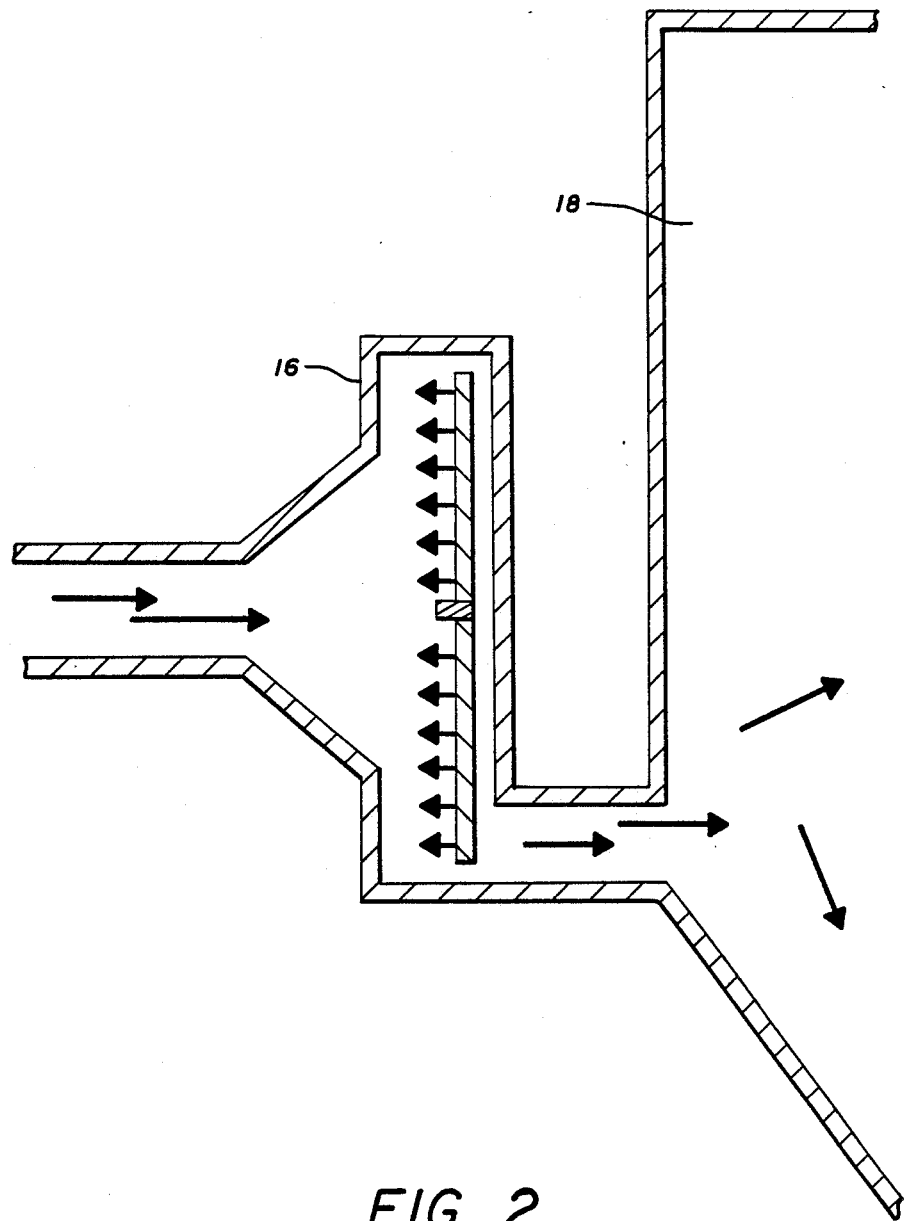
FIG. 2 is a diagram showing the air flow behind the third screen.

Referring now to the drawings, FIG. 1 is a schematic diagram showing the subsequent processing steps. The direction of passage of the material is shown by the arrows pointing to the right. The resulting dried phosphor is then transferred by vacuum (10) to holding means (12) such as a storage hopper. Any type of container can serve as the holding means. The dried material is then transferred by gravity to a vibratory feeder (14). From the vibratory feeder the material is transferred by gravity to a third screen or sifter (16) of greater than about 350 mesh. The material is then passed through the third screen as follows. The dried material is pulled to the third screen by vacuum and through the screen by vacuum. Meanwhile behind the screen, that is, the side of the screen receiving the screened material, there is a flow of air. FIG. 2 is a more detailed schematic diagram showing the flow of air, which is designated by the arrows pointing to the left. The combination of the pull of the vacuum to and through the screen and of the air flow behind the screen results in a gentle vibration of the particles of the dried material as they are being screened through the third screen.

Prior to the present invention, the material was screened by hand scooping in a high energy vibratory sifter. The sifter of the present invention (third screen) has no fan rotors unlike the current sifters in which there are fan rotors located directly behind the screening area. Rotary blades generally generate a high shearing action. The absence of rotary blades results in no damage to the phosphor crystals due to shearing action. A preferred sifter which is especially useful to the practice of the present invention is one manufactured by SWECO, INC. under the trade name of "turbo-sifter".

After the phosphor passes through the screen, it is transferred by vacuum to collecting means (18). The collecting means hold the material for packaging operations.

The above described holding and collecting means and feeders are important to the practice of the present invention because they enable the material to be fed at a constant rate to the third screen. Also the finished product is held so it can be packaged as needed.

The resulting phosphor is a stir-in type phosphor, that is, it can be used directly in the application without further processing such as milling.

The method of the present invention results in increased throughput. Typically the throughput is about 360 kg of material per hour as opposed to the prior throughput of about 80 kg/hr. This is an increase of about 450% over the prior methods.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for producing alkaline earth halophosphate stir-in phosphors, said method comprising:
    (a) forming a uniform mixture consisting essentially of in percent by weight from about 55 to about 75 calcium monohydrogen phosphate, from about 15 to about 35 calcium carbonate, from about 2 to about 20 ammonium chloride, from about 1 to about 15 manganese carbonate, from about 1 to about 15 antimony trioxide, and from about 2 to about 10 calcium fluoride, wherein the average particle size of said calcium monohydrogen phosphate as measured by Fisher subseive size is from about 4.6 to about 6.8 micrometers in diameter and the 50% size as measured by Coulter Counter is from about 9.0 to about 11.5;
    (b) firing said mixture in a non-reacting atmosphere at a temperature of from about 600° C. to about 1300° C. for a sufficient time to produce a fired material containing said phosphor;
    (c) milling said fired material in an aqueous acid;
    (d) wet screening the resulting milled material through a first screen of greater than about 300 mesh;
    (e) removing said aqueous acid from the resulting screened milled material;
    (f) suspending said screened milled material in water and screening the resulting suspension through a second screen of greater than about 350 mesh;
    (g) adding to the resulting screened suspension an aqueous base to form a slurry having a pH of from about 7.0 to about 9.0;
    (h) removing the liquid phase from resulting slurried phosphor material;
    (i) drying said slurried material in air at a temperature of from about 400° C. to about 700° C.;
    (j) transferring the resulting dried material by vacuum to holding means, and thereafter transferring said dried material by gravity from said holding means to a vibratory feeder;
    (k) transferring said dried material from said vibratory feeder by gravity to a third screen having a size of greater than about 350 mesh; and
    (l) passing said dried material through said third screen wherein vacuum pulls said dried material to and through said screen and at the same time a flow of air behind said third screen results in vibration of the particles of said dried material as they pass through said third screen, and thereafter passing the screened and vibrated particles under vacuum to collecting means.

* * * * *